2,615,459

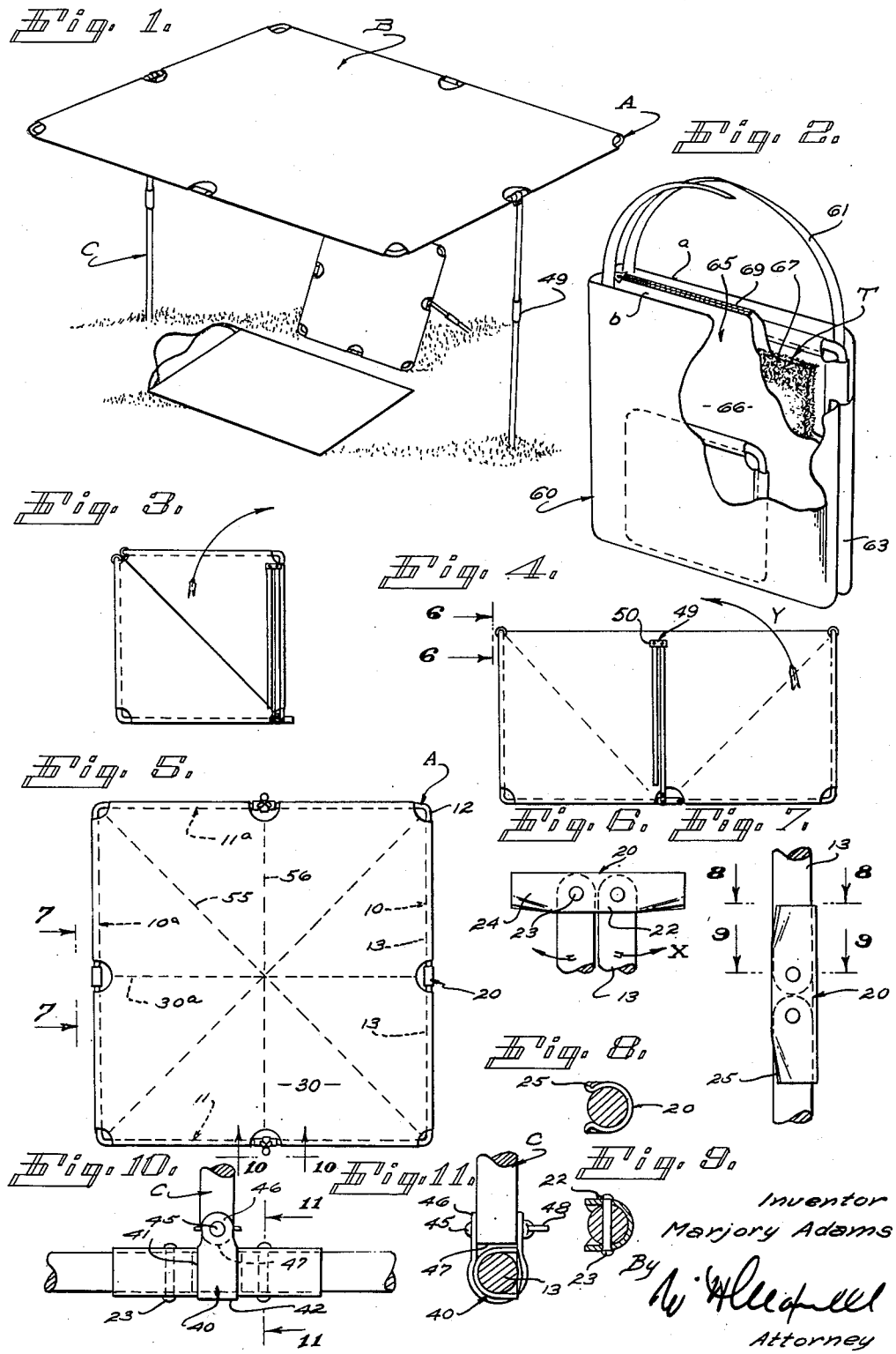

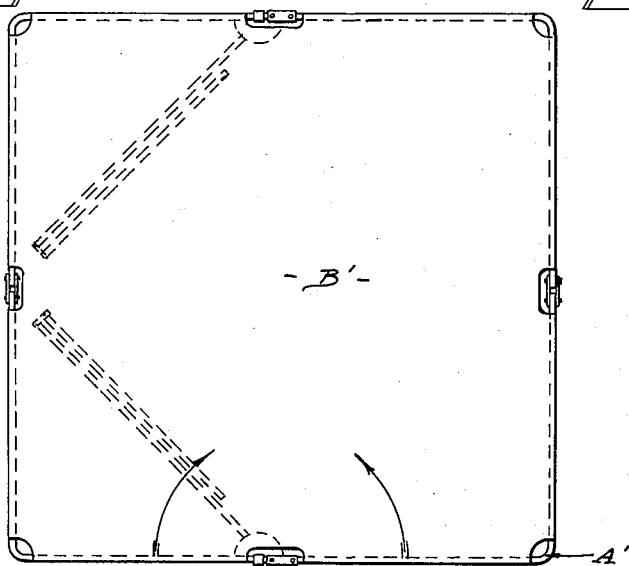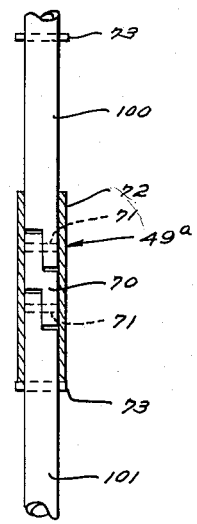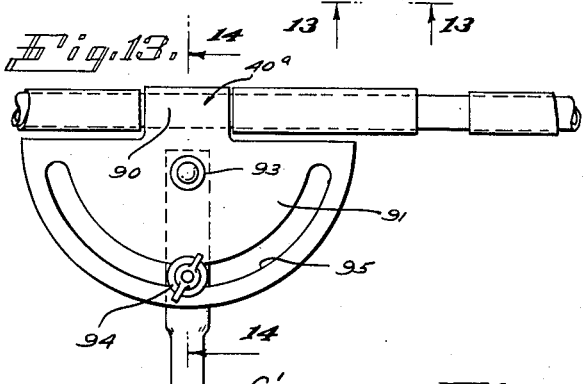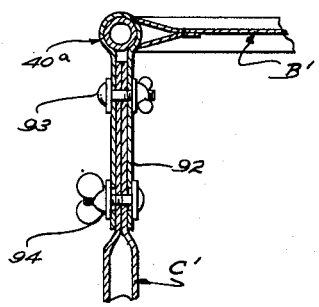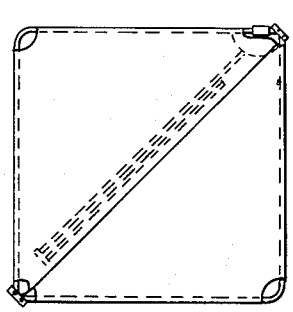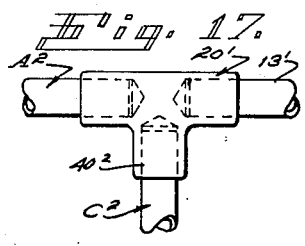
INVENTOR.
Marjory Adams
Attorney Patented Oct. 28, 1952

UNITED STATES PATENT OFFICE 2,615,459

PORTABLE PROTECTIVE SCREEN AND CARRIER THEREFOR

Marjory Adams, Laguna Beach, Calif.

Application October 5, 1949, Serial No. 120,691

4 Claims. (Cl. 135—5)

This invention is concerned with a portable protective screen and carrier therefor, it being a general object of the invention to provide a structure particularly adapted to be used by bathers, picnickers, campers, and the like, and which serves as an effective protection against weather such as wind, sun, rain, etc.

There are numerous situations where a protective screen is useful as, for instance, at times when a person wishes to protect himself against the elements, such as sun, rain, or wind, or to protect himself from the view of others. Such situations frequently occur at resorts such as sea shores. Equipment generally available for such protection is ordinarily limited to umbrellas or tents of various forms and such equipment is generally either heavy, cumbersome and complicated, and consequently expensive, or is flimsy, ineffective, and generally undesirable.

It is a general object of this invention to provide a protective screen which is of simple form and construction and which is of such nature that it may be easily handled or manipulated and when in use serves as a practical, effective, dependable screen.

A further object of the invention is to provide a structure of the general character referred to characterized by few simple parts that are inexpensive of manufacture and which are simple and convenient to manipulate or operate.

Another object of the invention is to provide a structure of the general character referred to characterized, generally, by a substantially rigid panel that may be rectangular in form, and legs or supports which are combined with the panel to effectively support, brace or maintain it in a most advantageous manner.

It is a further object of the invention to provide a structure of the general character referred to combined with a carrying case which serves to effectively house or carry the panel and which may further serve to carry articles of clothing or towels, etc., and when so employed forms a cushion-like structure that is practical and convenient to use.

The various objects and features of my invention will be fully understood from the following detailed description of typical preferred forms and applications of the invention, throughout which description reference is made to the accompanying drawings, in which:

Fig. 1 is a perspective view illustrating the structure provided by the present invention in a typical condition of use and showing two units of the invention of different sizes, one employed as a back rest or head support, the other being employed as a shade or screen, and also showing the carrier or carrying case arranged with relation to the other parts to form a cushion. Fig. 2 is a perspective view of the carrying case showing it carrying the two screens illustrated in Fig. 1, certain parts of the structure being broken away to appear in section to illustrate the details of construction and arrangement of parts. Fig. 3 is a view illustrating a screen or panel embodying the present invention in a fully collapsed or folded position suitable for convenient handling or transportation. Fig. 4 is a view of the screen shown in Fig. 3, showing it in a partly opened position. Fig. 5 is a plan view of the screen shown in Figs. 3 and 4 showing it in a fully opened position. Fig. 6 is an enlarged detailed view taken as indicated by line 6—6 on Fig. 4. Fig. 7 is a view of the parts shown in Fig. 6 opened out or in an extended position, being an enlarged view taken as indicated by line 7—7 on Fig. 5. Fig. 8 is a detailed transverse sectional view taken as indicated by line 8—8 on Fig. 7. Fig. 9 is a detailed transverse sectional view taken as indicated by line 9—9 on Fig. 7. Fig. 10 is an enlarged detailed view taken as indicated by line 10—10 on Fig. 5, showing the manner in which a leg is joined to the body of the frame. Fig. 11 is a sectional view taken as indicated by line 11—11 on Fig. 10. Figs. 12 to 16 of the drawings illustrate another form of the present invention, Fig. 12 being a plan view similar to Fig. 5. Fig. 13 is an enlarged detailed view of a portion of the structure taken as indicated by line 13—13 on Fig. 12. Fig. 14 is a sectional view taken as indicated by line 14—14 on Fig. 13. Fig. 15 is an enlarged sectional view taken as indicated by line 15—15 on Fig. 13, and Fig. 16 is a view similar to Fig. 3 showing the manner in which the screen shown in Figs. 12 to 15 of the drawings may be folded. Fig. 17 is a view similar to Fig. 13 showing another form of coupling.

The screen provided by the present invention may be used for various purposes as a protective structure or support and it may be made in various sizes depending upon the intended use. In the drawings, for example, in Fig. 1, two embodiments of the screen are illustrated, one a large form or embodiment suitable as a sun shade, wind break, or shelter generally, and the other a small form suitable as a head rest, back rest, or like structure. So far as the construction provided by the present invention is concerned it may be alike in various embodiments of the invention, that is, in either small or large structures, as shown in Fig. 1, it being understood that the details hereinafter described are applicable generally to screens for various uses or purposes.

The screen as provided by the present invention, and as shown in Figs. 1 to 11 of the drawings, is characterized, generally, by a frame or body A, a panel B carried by the frame, and supporting legs C combined with the frame. The frame A and legs C are preferably formed of tubing so that the structure is light and may be easily handled.

The frame A as provided by the present invention is a folding or collapsible structure, preferably rectangular in form, and as shown throughout the drawings it involves, generally, a plurality of rails or stretchers 10 and 10ᵃ and 11 and 11ᵃ. The rails or stretchers are rigidly joined to the corners 12 of the frame, and in the form of the invention illustrated the rails are joined at right angles to each other at the corners forming L-shaped units, which frame formation results in a screen which is rectangular in plan configuration.

Each rail or stretcher involves a multiplicity of sections pivotally coupled and the pivotal connections involved throughout the frame are such that it may be folded between an open or extended position as shown in Figs. 1 and 5, and a collapsed or compact position such as is shown in Fig. 3. In the particular form of the invention illustrated each stretcher involves two like sections 13, each a simple straight elongate member, and the sections are joined end to end by suitable connections or couplings 20. In the case illustrated the several sections 13 employed throughout the frame are alike in length and the couplings 20 are such as to hinge or pivotally connect the adjacent ends of the two sections 13 of each rail or stretcher of the frame.

In accordance with the broader aspects of the invention the coupling 20 joining or connecting the two sections of a stretcher may vary widely in form and construction. In the particular case illustrated each coupling involves a coupling member which is substantially U-shaped in cross sectional configuration so that it has spaced parallel sides 22 between which the ends of the stretcher sections enter to be held by pivot pins 23, which extend between the sides 22.

The U-shaped structure just referred to has end extensions which form clips 24 that releasably grip and hold the sections 13 when they are arranged end to end. The spaced side parts 22 between which the pivot pins 23 extend continue or project to the clip portions 24 where they may be fashioned or formed as at 25 to have lips which facilitate entrance of the sections 13 into the held position as the sections are swung in the directions indicated by the arrows X in Fig. 6. The pivot pins 23 are spaced apart lengthwise of the U-shaped structure just described, so that the sections 13 of the stretcher joined by the U-shaped structure may be swung to an in or folded position where they extend parallel to each other, as shown in the drawings.

The principle of construction just described may be employed throughout the frame, that is, in connection with each of the stretchers where its two sections are joined together, although in the particular form of the invention illustrated the couplings joining the sections of stretchers 11 and 11ᵃ are extended somewhat to accommodate the legs C, as will be hereinafter described.

From the foregoing description and from consideration of Figs. 6 and 7 of the drawings, it will be apparent that the axes of the pivot pins 23 are normal to the longitudinal axes of the stretcher sections. In accordance with the present invention the couplings 20 joining the sections 13 of stretchers 10 and 10ᵃ have the axes of the pivot pins 23 disposed parallel with a line of fold 30 so that the frame can be readily collapsed from a fully extended position where it is in a common plane and flat, as shown in Fig. 5, to a half folded position such as is shown in Fig. 4. In the half folded position the sections 13 of rails 10 and 10ᵃ are folded back on each other, while the rails 11 and 11ᵃ are adjacent each other and parallel.

The connections 20 joining the sections 13 of rails 11 and 11ᵃ have their pins 23 so disposed that their axes are perpendicular to the plane of the screen or to the plane of the half folded structure, as shown in Fig. 4, so that the sections 13 of stretchers 11 and 11ᵃ may be readily swung in the direction indicated by arrow Y in Fig. 4 to a position where they are normal to each other, or form a 90° angle, as shown in Fig. 3 of the drawings. In this latter condition the screen is fully folded and is but one quarter the size it was originally, or when fully extended as shown in Fig. 5.

By thus providing a frame structure wherein the pivotal connections between the sections of one pair of stretchers is in the plane of the screen while the pivotal connections between the sections of the other pair of stretchers are normal to the frame, the frame lends itself to being readily operated between the fully extended or opened out condition shown in Fig. 5 and the fully collapsed or folded in position shown in Fig. 3. It is to be understood, of course, that the couplings 20 which join the sections of the stretchers are such as to allow free hinging or pivotal movement between the sections and yet serve to effectively yieldingly hold them in the fully extended or aligned condition, once they have been moved thereto.

In the preferred form of the invention the structure involves two like legs C. The legs may be coupled with or joined to the frame at any desired point or in any desired manner. However, it is preferred that the legs be joined to the frame at points where the sections of frame stretchers are coupled together. In the form of the invention illustrated the legs C are shown connected to the frame at the points where the sections of stretchers 11 and 11ᵃ are joined or coupled.

The connection provided for connecting a leg C with a coupling 20 joining sections of a stretcher involves a double pivot or universal connection enabling the leg to be swung or pivoted in two different directions in order to enable it to be arranged at the desired angle relative to the screen and so that it can be arranged in compact form with the folded screen as shown in Fig. 3.

In the particular case illustrated in Figs. 1 to 11 of the drawings two legs C are provided and they are connected to the frame by couplings 40 at the couplings 20 that join the sections of stretchers 11 and 11ᵃ. The particular couplings 20 to which the legs are connected are extended somewhat at 41 between the points where the pivot pins 23 are carried. The coupling 40 involves a sleeve 42 which surrounds the portion 41 of the supporting coupling 20 and the leg C is joined to the sleeve 42 by a suitable fastener 45. In the particular case illustrated the sleeve 42 is a split sleeve having spaced projecting ears 46 between which the end portion 47 of the leg is entered. The fastener 45 is shown as a screw fastener engaged through the ears 46 and portion 47 of the leg and involves a wing nut 48 that can be operated to tighten the ears onto the leg portion 47 to, in one operation, set the sleeve 42 on the supporting portion 41 and set the leg portion 47 against movement relative to the ears 46.

In the preferred form of the invention the legs may be sectional. In Figs. 1 to 11 of the drawings each leg is shown divided into two sections connected by means of a coupling 49. The coupling 49 may be U-shaped in cross sectional configuration, like coupling 20 above described, so that it has spaced parallel sides between which the opposing ends of the leg sections enter to be held by pivot pins 50. The U-shaped structure of the coupling 49 grips the leg sections when the sections are in end to end relation and holds the leg rigid in the extended position. Each leg may be folded at its coupling 49 so its sections are side by side and it may be swung or pivoted about its coupling 20 so it is flat against the panel B as shown in Fig. 3 and Fig. 4. When in use, the leg sections are arranged end to end each leg may be manipulated to depend from the body A of the screen to engage the ground and support the screen in the desired manner as shown in Fig. 1.

The panel B of the screen is a flexible element preferably a single continuous sheet of flexible material. In practice the panel may be advantageously formed of canvas or the like, in which case it is practical to employ a rectangular sheet of material and suitably secure the edges or edge portions thereof to the sections 13 of the frame A. In the case illustrated the edge portions of the sheet of material forming panel B are wrapped around the straight plain members forming the sections 13 and the panel is slightly indented or relieved at each of the several connections between sections 13 and at the corners 12, as shown throughout the drawings. By employing a suitable flexible material in the formation of panel B the panel folds and in no way interferes with operation of the frame between the extended and collapsed positions.

With the construction that I have provided the panel 30 naturally and readily folds along the line 30ᵃ when the frame is folded from the position shown in Fig. 5 to that shown in Fig. 4 and as the frame is folded from the position shown in Fig. 4 to that shown in Fig. 3 the panel readily folds along lines 55 and 56 indicated in dotted lines in the drawings.

In the form of invention illustrated in Figs. 12 to 16 of the drawings the body A' and panel B' are the same as above described but the legs C' involve a different construction. In this form of the invention the legs may be longer than the legs in the form shown on sheet one of the drawings and may be extended diagonally across the panel as indicated in Figs. 12 and 16 when the structure is to be folded.

Each leg has sections 100 and 101 and a coupling 49ᵃ connects the opposing ends of the leg sections. The coupling involves an elongate block or link 70 that pivotally connects the leg sections so that they may be folded one against the other to be side by side as indicated by dotted lines in Fig. 13. Pins 71 join the ends of the legs to spaced parts of the block.

A lock sleeve 72 is slidably engaged over the joined end portions of the leg sections to normally engage over the block and retain the legs extended or in end to end relationship as shown in Fig. 15. The sleeve can be slid along the structure to a position clear of the block to free the leg sections for pivotal movement relative to the block.

Upper and lower stops or pins 73 limit the movement of the sleeve along the leg sections. The lowermost pin 73 stops the sleeve in the position shown in Fig. 15 where the sleeve embraces the adjoining end portions of the two leg sections and the block and thus secures the leg in a rigid extended position. By sliding of the sleeve upward into engagement with the upper stop pin 73 the lower leg section and block are uncovered permitting the leg sections to be folded together so that they occur side by side or adjacent each other.

In Fig. 13 I have illustrated a connection for joining a leg C' with a section of a stretcher. In this form of my invention a coupling 40ᵃ is carried by a stretcher of the frame A' at a point adjacent the coupling of that stretcher. The coupling 40ᵃ has a sleeve portion 90 that is engaged around the frame stretcher to rotate thereon and thus swivelly connects the leg to the frame so that the leg is free to swing or pivot relative to the frame about the axis of said structure of the frame.

The coupling 40ᵃ has a flange-like projection that carries the leg. In the preferred construction the leg carrying projection is formed of plates 91 that project laterally from the sleeve portion. The plates 91 are flat and spaced apart to be in parallel planes disposed axially of the frame structure. The upper end of the leg is entered between the plates and is pivotally connected thereto. The upper portion of the leg is preferably flattened at 92 where it enters between the plates, and a suitable connecting member 93 pivotally connects the upper end of the leg with the plates at a point adjacent the sleeve portion 90 and on an axis normal to the planes of the plates.

The invention provides means releasably securing the leg against pivotal movement about the axis of the pivot member 93. In the preferred form of the invention a manually operated screw or clamp fastener 94 is provided to releasably hold the leg against movement relative to the plates 91. The fastener 94 engages the leg at a point somewhat removed or outward of the pivotal connection 93. Fastener 94 extends between the plates 91 and through the leg. Arcuate slots 95 are provided in the plates concentric with pivotal connection 93 to allow for the desired pivotal movement of the leg when the fastener 94 is released.

When it is desired to adjust the panel B' relative to the legs C, or the legs relative to the panel as the case may be, the fasteners 94 are loosened allowing the legs to swing between the plates 91. When it is desired to set the structure in a given position the fasteners 94 are set or made tight so the legs are clamped between the plates.

In the preferred construction the sleeve portion 90 and the plates that project therefrom are formed of a single body of sheet metal and the outer edge portions of the plates are curved concentric with the pivotal connections 93 and the arcuate slots that pass the fasteners 94.

The present invention provides a carrier 60 for the screen when it is in the folded or collapsed position and in the preferred form of the invention, where screens of different sizes are used, a single carrier may be employed to carry both of the screens. In the particular case illustrated the carrier 60 is a bag-like structure which is open topped and provided with a suitable handle 61. The particular bag illustrated has flat rectangular side panels 62 joined by suitable telescoping edge portions 63, the panels 62 being large enough so that the bag will accommodate the largest screen to be carried. In the preferred construction a partition 65 is provided in the bag-like carrier which partition divides the carrier into compartments $a$ and $b$, each of which can be employed to carry a screen as shown in the drawings. In the case illustrated the partition 65 is formed of spaced walls 66 forming a pocket or receptacle 67 for carrying wearing apparel such as bathing suits, or the like, or towels, etc. The sides or panels 66 of the partition 65 are releasably joined at their upper ends by a zipper fastener 69 or the like. In the drawings a towel T is shown carried in the pocket-like partition. When the screens are removed from the carrier 60 as shown in Fig. 1, the carrier, with articles such as towels T, or the like, in it forms an effective, comfortable pillow or seat cushion and it may be advantageously related to the screens in a manner such as is illustrated in Fig. 1 of the drawings.

It is to be understood, of course, that the carrier 60 may be formed of suitable durable material and may even be water-tight, if necessary. Ordinarily the carrier will be formed of canvas or of a material similar or practical with the material employed in the formation of the panel B.

In Fig. 17 I have illustrated another form of coupling wherein the several sections 13' and legs $C^2$ are joined by flexible couplings 20'. The particular coupling illustrated is a simple T shaped rubber coupling, having end openings therein to receive the various sections. Two of said openings are axially in line to receive the sections 13' of the frame $A^2$ while the third is provided in the end of a lateral extension $40^2$ to receive the leg sections $C^2$. It is to be understood that the couplings 20' which are not used where the legs $C^2$ occur, need only be straight couplings, without the lateral extensions $40^2$.

Having described only typical preferred forms and applications of my invention, I do not wish to be limited or restricted to the specific details herein set forth, but wish to reserve to myself any variations or modifications that may appear to those skilled in the art and fall within the scope of the following claims.

Having described my invention I claim:
1. A protective screen including, a rectangular collapsible frame including stretchers each having sections pivotally connected by couplings, a leg, and means pivotally connecting the leg to a coupling including pivotal axes normal to each other.

2. A protective screen including, a rectangular collapsible frame including stretchers each having sections pivotally connected by couplings, a leg, and means pivotally connecting the leg to a coupling including a collar rotatable on the coupling and a pivot pin connecting the leg and collar.

3. A structure of the character described including, a collapsible frame carrying a flexible cover and having sections pivotally connected by a plurality of couplings, a leg, a sleeve rotatable on one of the couplings and having a lateral projection located in a plane parallel with the axis of the sleeve, means pivotally connecting the leg to said projection on an axis normal to the plane of the projection, and clamp means releasably securing the leg against movement relative to the projection, the projection including spaced plates with the leg secured between them.

4. A protective screen including, a rectangular collapsible frame including two pairs of parallel stretchers each including like sections and couplings pivotally connecting the sections together end to end, the sections of adjoining stretchers being rigidly connected together at the corners of the frame forming like rigid L shaped units, a pair of legs, connections connecting each leg to the frame including two axes at right angles to each other, and a continuous panel carried by the frame and flat when the frame is open.

MARJORY ADAMS.

REFERENCES CITED

The following references are of record in the file of this patent:

UNITED STATES PATENTS

| Number | Name | Date |
| --- | --- | --- |
| 1,453,989 | Norlund | May 1, 1923 |
| 1,653,822 | Pliskin | Dec. 27, 1927 |
| 2,023,155 | Turner | Dec. 3, 1935 |
| 2,045,840 | Davey | June 30, 1936 |
| 2,166,625 | Deak | July 18, 1939 |
| 2,197,478 | Mathieu | Apr. 16, 1940 |
| 2,502,103 | Puls | Mar. 28, 1950 |

FOREIGN PATENTS

| Number | Country | Date |
| --- | --- | --- |
| 745,004 | France | June 31, 1933 |